Patented Jan. 5, 1926.

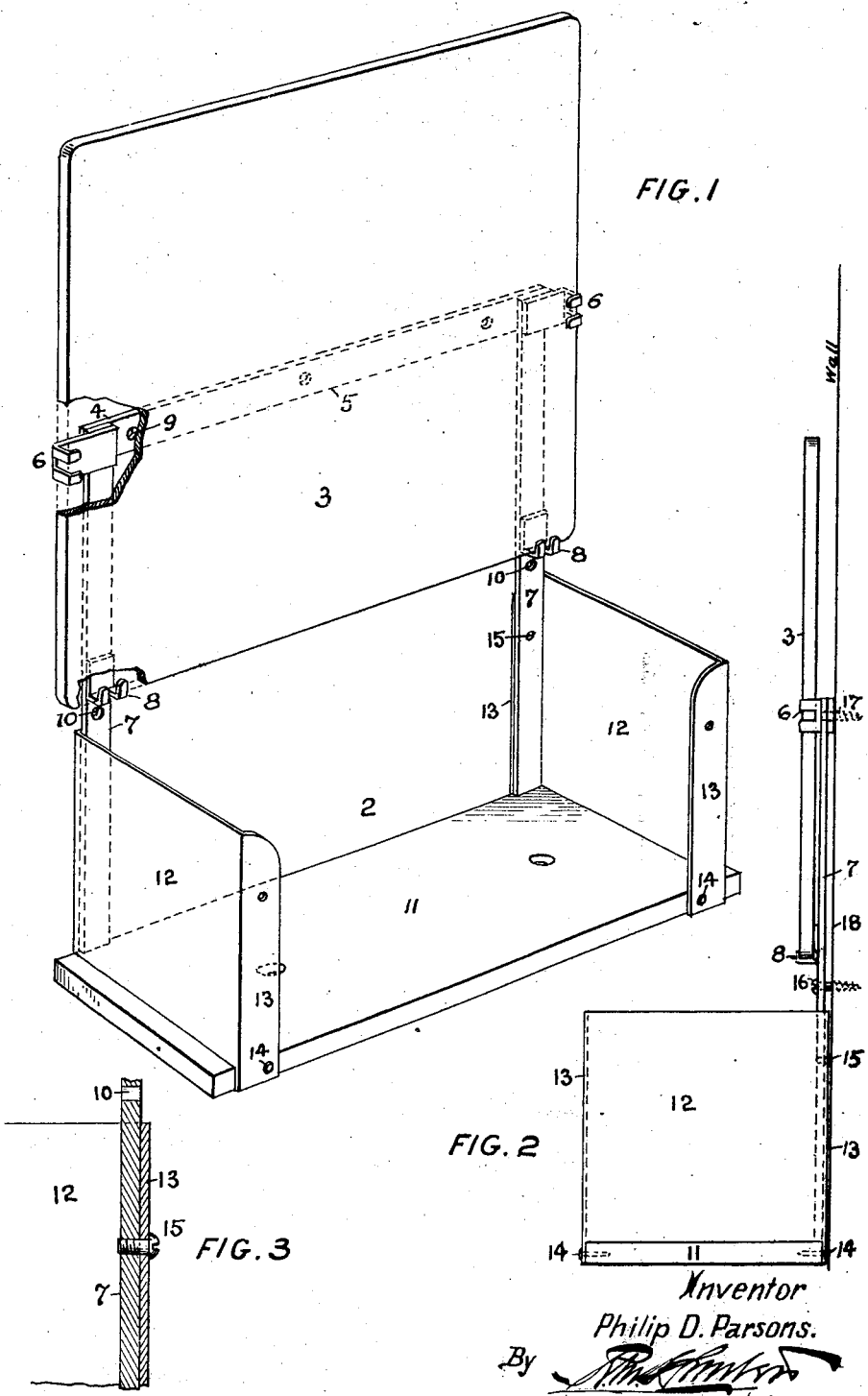

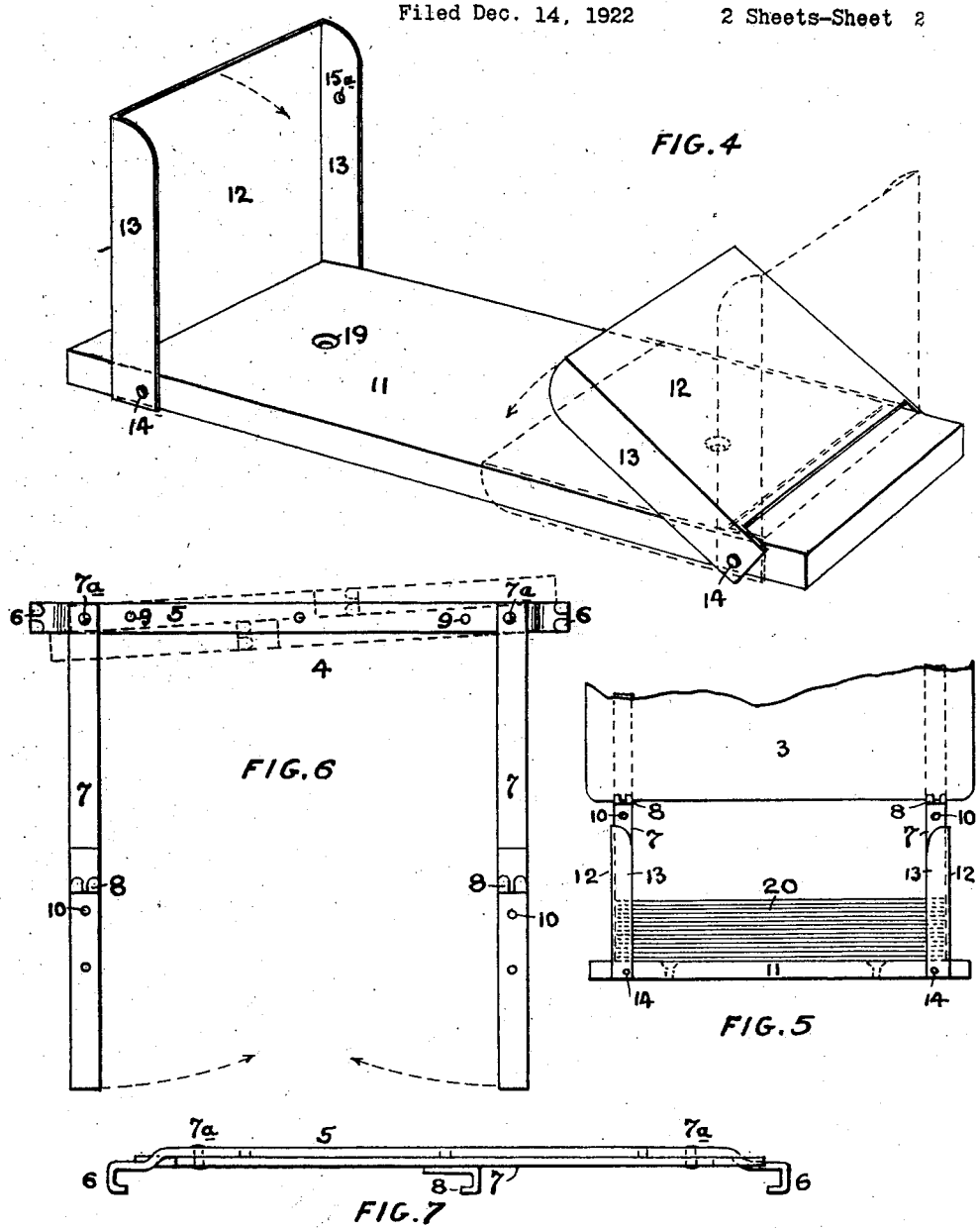

1,568,690

UNITED STATES PATENT OFFICE.

PHILIP D. PARSONS, OF PHILADELPHIA, PENNSYLVANIA, ASSIGNOR TO SCOTT PAPER COMPANY, A CORPORATION OF PENNSYLVANIA.

COMBINATION MIRROR AND TOWEL RACK.

Application filed December 14, 1922. Serial No. 606,779.

*To all whom it may concern:*

Be it known that I, PHILIP D. PARSONS, a citizen of the United States, and resident of Philadelphia, county of Philadelphia, and State of Pennsylvania, have invented an Improvement in Combination Mirrors and Towel Racks, of which the following is a specification.

My invention has for its object a toilet fixture embodying a combined mirror and towel-rack of a portable character and comprising collapsible and detachable portions which are capable of being closely packed for shipment and which, when assembled and attached to a wall or other support, provides a rigid and desirable fixture which is suitable both for wash rooms and general office equipment. A portable mirror and towel-rack of the character of the present invention is also suitable for "towel service," as commonly conducted, wherein towels and soap are provided in connection with a suitable mirror and towel-rack.

The invention consists of a metallic frame provided with claws or clamps extending about the sides and bottom of the mirror for holding it in vertical position, said frame having downwardly extending leg portions combined with a horizontal shelf portion having hinged ends which, when turned into a vertical position, are secured to the leg portions so that they become rigid with respect thereto and provide between them above the shelf an open receptable in which the folded towels (preferably paper) may be stacked; the construction being such that the shelf and hinged ends thereof may be detached from the mirror supporting frame and the hinged ends turned down to collapse the structure and the mirror readily detached from the supporting frame, whereby the parts may be packed in a condensed arrangement requiring relatively small space and at the same time protecting the elements making up the structure against breakage during transportation.

The invention also consists of details of construction which, together with the features above specified, will be better understood by reference to the drawings, in which:

Fig. 1 is a perspective view of a combined mirror and towel-rack embodying my invention; Fig. 2 is an end elevation of the same attached to a wall; Fig. 3 is a vertical section through the leg portion and one of the end plates of the shelf; Fig. 4 is a perspective view illustrating the towel-rack or support detached from the mirror supporting frame and partly collapsed; Fig. 5 is an elevation, with a portion of the mirror broken away, showing my improved towel-rack and mirror with the towels in place; Fig. 6 is an elevation of the mirror supporting frame when made in a collapsible form, whereby the parts may be turned in the same alinement for shipment; and Fig. 7 is an edge view of the same when collapsed.

2 represents the towel rack structure and 3 is the mirror, the same being supported by a metallic frame structure 4 and by which it is relatively positioned and connected to the towel-rack.

More specifically describing these parts, the frame 4 consists of a horizontal metal bar 5 provided at each end with claws or clamps 6 for gripping the vertical side edges of the mirror 3 and said horizontal bar 5 is provided, near each end, with downwardly extending bars or leg portions 7 which are also provided midway of their length with similar claws or clamps 8 which receive and hold the lower edge of the mirror. In this manner, the mirror rests upon the supports or claws 8 and is thereby sustained in a vertical direction while, at the same time, it is positioned laterally by the claws or clamps 6. The mirror is thus detachably supported by the frame and may be removed for packing and shipment, and for providing access to the horizontal bar 5 when it is desired to fasten it to a wall 18 by means of screws 17 (Fig. 2) which would pass through the holes 9 therein. The vertical bars or leg portions 7 are also provided with holes 10 through which screws 16 may pass for additional attachment to the wall.

Referring to the towel-rack structure 2, the same consists of a bottom board or shelf portion 11 which may be made of wood or metal and provided, adjacent to each end, with hinged metal frames 12 which are provided with narrow flanges 13 extending down upon the opposite edges of the board or shelf and pivoted thereto by pivot nails or screws 14. As the pivot nails 14 are out of alinement with the vertical body portions of the plates 12, the same are held in a vertical direction and at right angles to the board or shelf 11 by contact therewith when raised, as will be clearly understood from Fig. 1. At the same time, the position of the pivot nails 14 is such that the plates 12 may be turned downward to lie flat upon the shelf or board 11, as is indicated at the right hand end of Fig. 4. In this manner, both of the plate structures 12 may be turned down flat upon the board or shelf 11 so as to occupy a relatively small space during shipment. When assembled with the mirror, the end frames 12 are adjusted to the vertical positions and the downwardly extending leg portions 7 are fitted against the inside of the side flanges 13 which would come next to the wall and are secured thereto by screws 15 (Figs. 1 and 3). In this connection, it is desirable that the leg portions 7 shall rest directly upon the board or shelf 11, as shown, though this is not essential. However, in cases where the towel rack is supported upon a shelf as a fixture in a house, then the downward thrust due to the weight of the mirror and its frame would be sustained by the board 11 and less reliance would be required upon the screws 16 and 17. Holes 19 may be provided in the bottom board 11 through which screws may pass for securing the device to a permanent shelf on the wall, when it is desired to be supported thereby. When the towel-rack 2 is assembled with the mirror supporting frame, as shown in Fig. 1, it is manifest that the parts bear a relatively fixed relation and constitute a substantial structure in which the end frames 12 are positively held against collapsing by the action of the leg portions. The device, as a whole, is suitable for office or other use, where a towel service system is desired and the towels, preferably paper towels, in folded condition are stacked upon the shelf or bottom board 11 and between the end frames 12, as indicated at 20 in Fig. 5.

When the various parts are in the condition shown in Fig. 1, the complete structure is as it would appear when fastened to the wall (Fig. 2) or otherwise supported. When it is desired to ship or transport the device, the mirror 3 is lifted from the supporting frame 4, the screws 16 and 17 are removed, the screws 15 are next taken out to release the towel-rack from the leg portion 7, and said screws may then be reinserted in the screw holes in the leg portions so as not to become lost. The towel-rack is then separated from the frame 4 and the end frames 12 turned down flat upon the shelf or bottom board 11, and the several parts stacked together and packed for shipment in a flat bundle or carton. It will be noted that the vertical height of the frame 4 is preferably equal to the vertical height of the mirror, so that when these two parts are disconnected and arranged one upon the other for shipment they will not occupy any greater space than the general area of the mirror.

In cases, however, where it is desirous that the mirror shall be of less vertical height, I then prefer to make the supporting frame 4 collapsible, so as to occupy less space for shipment. Such a collapsible arrangement of the parts is shown in Figs. 6 and 7. The horizontal bar 5 with the claw or clamp ends 6 is provided, near each end, with the leg portions 7 united with said horizontal portion 5 by means of rivets 7ª which constitute hinges between the said parts 5 and 7. This will permit the leg portions 7 being turned upwardly, as indicated by the dotted arrows in Fig. 6, and whereby they may assume the contacting positions adjacent to the horizontal bar 5, as shown in dotted lines at the upper part of said figure. It is also to be understood that, if desired, this collapsibility of the frame 4 as embodied in Figs. 6 and 7 may also be employed with the large mirror, in lieu of the rigid construction of frame 4, in that there is no difference between the two structures, except that the union between the leg portions 7 and the horizontal bar 5, in the one case, is rigid, and in the other case, is pivoted.

It will also be understood that, while the collapsibility of the end frames 12 in respect to the bottom board or shelf 11 is desirable, it is not essential to the broad construction of the invention, its collapsibility being more particularly directed to the facility for shipment.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. In a device of the character stated, the combination of a collapsible towel-rack having hinged end portions, a metallic frame to which the towel-rack is detachably secured and extending upwardly therefrom for suspending the towel-rack in open operable condition, and mechanical connections between the metallic frame and the towel-rack for holding the hinged end portions in spaced relation and, whereby the rack and frame may be separated to permit the towel-rack to be collapsed for shipment.

2. The invention according to claim 1, wherein the metallic frame is formed of a horizontal bar having clamping means adapted for supporting a mirror at each side and has also downwardly projecting leg portions forming the connection with the hinged end portions of said collapsible towel-rack and provided with means adapted for sustaining the lower edge of a mirror whereby it may be positioned vertically with relation to the towel-rack.

3. The invention according to claim 1, wherein the collapsible towel rack is provided with a bottom board or shelf to which the hinged end portions are jointed and said end portions are provided with flanges, and in which also the metallic frame is provided with downwardly extending leg portions secured to the inner flanges of the respective pivoted hinged end portions, said metallic frame and its leg portions holding the said hinged end portions of the towel rack in upright and spaced relation.

4. The invention according to claim 1, wherein the metallic frame consists of a horizontal bar and two downwardly extending leg portions respectively hinged to the bar near its opposite ends whereby the frame may be collapsed for shipment and said leg portions extending downwardly and attached to the hinged end portions of the towel rack when in use.

In testimony of which invention, I hereunto set my hand.

PHILIP D. PARSONS.